(12) United States Patent
Russell

(10) Patent No.: US 6,648,339 B2
(45) Date of Patent: Nov. 18, 2003

(54) SEAL ASSEMBLY, ITS USE AND INSTALLATION

(76) Inventor: Larry R. Russell, 3607 Gramercy, Houston, TX (US) 77025-1320

( * ) Notice: Subject to any disclaimer, the term of this patent is extended or adjusted under 35 U.S.C. 154(b) by 119 days.

(21) Appl. No.: 09/788,971

(22) Filed: Feb. 19, 2001

(65) Prior Publication Data

US 2001/0045700 A1 Nov. 29, 2001

Related U.S. Application Data

(60) Provisional application No. 60/184,169, filed on Feb. 21, 2000, and provisional application No. 60/184,168, filed on Feb. 21, 2000.

(51) Int. Cl.[7] .......................... H01G 15/013; F16J 15/02
(52) U.S. Cl. ...................... 277/617; 285/309; 277/314; 277/620; 277/630; 277/637
(58) Field of Search ................................. 277/314, 316, 277/609, 616, 620, 621, 626, 627, 650, 630, 637; 285/309, 319, 321

(56) References Cited

U.S. PATENT DOCUMENTS

| | | | | |
|---|---|---|---|---|
| 3,150,886 A | * | 9/1964 | Briegel et al. | ........... 285/149.1 |
| 3,325,174 A | * | 6/1967 | Weaver | ....................... 277/604 |
| 3,622,427 A | * | 11/1971 | Kelly | .......................... 277/651 |
| 3,695,640 A | * | 10/1972 | Clague | ........................ 285/116 |
| 4,728,125 A | * | 3/1988 | Reneau | ......................... 285/18 |
| 5,437,489 A | | 8/1995 | Sanders et al. | |
| 5,520,398 A | * | 5/1996 | Brandon | ..................... 277/409 |

OTHER PUBLICATIONS

*Parker O–Ring Handbook*, Parker Seal Group, O–Ring Division, Parker Corporation, Mar. 1982.
"Getting to Know O–Rings", *Machine Design*, Nov. 18, 1999, pp. 102–104.
"Flanged End Connectors", "Pipe End Connectors", and "Split Sleeve Repair Clamps", Product Bulletins in *Products & Services*, Catalog, IPSCO, Downers Grove, Illinois, 1998.
"Spool Piece Repair Units" and "General Product Specification: Mark V Hydrocouple", Catalog Sections, HydroTech Systems, Inc., Houston, Texas 1995.
"INCCO Split Repair Clamp", HydroTech Systems, Inc., Houston, Texas, 1995.
*Piping Repair & Maintenance Products*, Catalog, Plidco International, Inc., Cleveland, Ohio, 1992.
"The Smart Pipeline Repair System", Brochure, Oceaneering International, Inc., Houston, Texas, 1992.
*Metal Spring Energized Seals Design Handbook*, Greene, Tweed & Co., Inc., Kulpsville, Pennsylvania, 1993.
"No–Weld Adapter", Brochure, Petroleum Equipment Division, Stewart & Steveson, Houston, Texas (U.S. Patent 4,799,714).
"Pipeline Repair Products: Pipe Repair Clamp", Catalog Section, Hydrotech Systems, Inc., Houston, Texas, 1995.
"New Mechanical Hot Tap Clamp Introduced in the Gulf of Mexico", Gulf Publishing Co. article reprint, Houston, Texas, 1994 included with "BIMS Tap™ Tee" Sales Brochure, Big Inch Marine Systems, Houston, Texas.

* cited by examiner

*Primary Examiner*—Anthony Knight
*Assistant Examiner*—Enoch E Peavey
(74) *Attorney, Agent, or Firm*—Elizabeth R. Hall

(57) ABSTRACT

A method and apparatus for installing seals in an interference fit with a comating sealing surface by initially stretching the seal installed in a groove to reduce its cross-sectional thickness perpendicular to a comating sealing surface. The stretched seal is mated with a comating surface and then relaxed, permitting the seal to return to an unstretched position and to passively assume a preloaded position against the comating sealing surface. The seal may be repeatedly disengaged and reengaged by selectably restretching the seal and then selectably releasing it upon completion of repositioning.

66 Claims, 9 Drawing Sheets

SEAL ASSEMBLY, ITS USE AND INSTALLATION

CROSS-REFERENCE TO RELATED APPLICATION

The present application, pursuant to 35 U.S.C. 111(b), claims the benefit of the earlier filing date of provisional application Ser. No. 60/184,169 filed Feb. 21, 2000, and entitled "Novel Method and Apparatus for Sealing." The present invention is also related to another provisional patent application Ser. No. 60/184,168 also filed Feb. 21, 2000 entitled "Improvements to Antiextrusion Means for Seals."

BRIEF DESCRIPTION OF THE INVENTION

The present invention relates to a seal assembly having an elastomeric seal bonded to a static end and a movable end. More particularly, the invention relates to an apparatus and process whereby an elastomeric seal is initially stretched in a direction parallel to its axis and parallel to its comating surface to reduce its cross-section parallel to the comating sealing surface. The stretched seal is installed adjacent the comating surface and then relaxed, permitting the seal to return to an unstretched position and to assume a preloaded position against the comating sealing surface.

BACKGROUND OF THE INVENTION

Elastomeric seals are in very common use in a wide variety of applications as a means for closing off a passageway (gap) between two parts. The parts are usually metallic and will allow fluids to pass through the gap where the two pieces are joined. To prevent the escape or loss of fluid at these gaps, flexible elastomeric seals are used to close the gap between the two parts. To achieve this function, one side of the elastomeric seal is placed in a cavity or groove in a first part and the exposed side of the seal is comated with the surface of a second part. The prevention of fluid passage through a gap between such parts generally relies upon the maintenance of an initial interference fit with attendant interface biasing forces between the sealing element and the two parts.

This interference fit is termed 'presqueeze'. Additional interface biasing forces are produced as a consequence of seal distortion and loading by retained pressure. This behavior is well known and is described in the design guides provided by O-ring manufacturers in their technical literature and is generally pertinent to all cross-sectional types of seal, not just circular cross-sections.

Attendant with this interference fit is the risk of physically damaging the seal during its installation by abrasion or cutting from contact with the comating surface during installation. This damage can result from either cutting on edges or from twisting or tearing from excessive frictional drag when presqueeze is excessive. For this reason, the amount of interference fit often must be limited in order to ease or even enable assembly. Seals using plastics with spring expanders instead of elastomers are particularly sensitive to this type of assembly damage.

As fluid pressure is applied to the elastomeric seal, the seal will deform and shift in the direction of the fluid. With time under high pressure loads and/or as the pressure increases, the seal will continue to distort or "creep." This behavior is further enhanced if the elastomeric seal shrinks in volume or is weakened by its interaction with the retained fluids. Thus, elastomeric seals may lose a substantial portion of their interference fit over time due to creep ('compression set') or shrinkage volume changes. These problems are significantly amplified as the size of the gap to be sealed is increased.

A frequent solution often used for large gap situations has been to selectively compress the seal by mechanical means after installation in order to achieve adequate presqueeze. This active, rather than passive, approach is commonly used for the basically rectangular cross-section seals used with both tubular and split pipeline repair clamps, as for example in Reneau, U.S. Pat. No. 4,728,125. The seals for these clamps may be either circumferential or linear face seals, and the circumferential seals may also be integral circles or split into semicircles.

Compression applied to the seal by tightening the comating surface against one lateral side of the seal causes the seal to extend the seal radially thereby mating and sealing with the comating member. For example, for typical tubular pipeline repair clamps, jack bolts acting parallel to the tubular axis to provide axial compression on the circumferential seals cause the seals to fully engage with the comating member. This approach often requires later recompression of the seal to offset the unloading effects of creep or volume reduction. In practice, such recompression is an operational nuisance, very expensive, and often impractical.

Stewart & Stevenson of Houston, Tex. have used a different approach to seal installation. Its seal is initially recessed into a groove and then forced into contact with the comating member of the seal by directly applying hydraulic pressure to the back side of the seal groove. Sealing relies upon permanently trapping the actuating pressure behind the seal in its groove. This system is not configured for large gaps, but it does avoid interference fit-induced damages during assembly. However, reliability of such a seal is questionable because the actuating fluid may leak off, relieve the pressure and cause the seal to fail.

The significant areas of performance difficulty for large gaps and high pressures with the cited types of existing seals frequently lead to leaks or complete seal failures. For critical service conditions, such as deep water subsea pipeline repair clamps or hot-tap pipeline fittings, revisiting the clamp for adjusting the compressional preload on installed seals is prohibitively expensive. Further, providing more compressional preload in such cases is not practical for reasons of installation damage to the seal due to excessive interference and increased tendency of the seal to creep and extrude through the gap with high preloads.

Thus, a need exists for a means to install a preloaded seal that does not rely on applying external mechanical force to compress the seal against its comating surface.

SUMMARY OF THE INVENTION

The invention contemplates a simple, inexpensive device for eliminating the problems and disadvantages of the prior approaches discussed above. The present invention relates to a seal assembly having an elastomeric seal bonded to both a static end and a movable end. An apparatus and process whereby an elastomeric seal is initially stretched to reduce its cross-sectional thickness perpendicular to the comating sealing surface is described. The stretched seal is installed into the groove or recess and then relaxed, permitting the seal to return to an unstretched position and to assume a preloaded position against the comating sealing surface.

One aspect of the present invention is an elastomeric seal housed in a mounting groove or recess and suitable for sealing large gaps such that the seal will be non-interfering or have minimal interference with its comating surface during installation positioning. Once installed the seal does not require externally applied mechanical compression in order to effect the seal against its comating surface, thereby providing self preloading sealing prior to retention of pressure by the seal. This self preloaded seal is relatively immune to shrinkage and/or creep due to its ability to self-compensate for variations in rubber volume and gap size. The seal is selectably engagable and disengagable and can be set multiple times without damage to the seal.

Another aspect of the present invention is an elastomeric seal configured so that it will be pressure biased against its comating surface when subjected to pressure from one side.

Yet another aspect of the present invention is an elastomeric seal configured so that it will entrap pressure applied from either side in a manner such that it will be assisted in maintaining its contact with the comating surface.

The foregoing has outlined rather broadly several aspects of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed might be readily utilized as a basis for modifying or redesigning the structures for carrying out the same purposes as the invention. It should be realized by those skilled in the art that such equivalent constructions do not depart from the spirit and scope of the invention as set forth in the appended claims.

BRIEF DESCRIPTION OF THE DRAWINGS

The novel features which are believed to be characteristic of the invention, both as to its structure and methods of operation, together with the objects and advantages thereof, will be better understood from the following description taken in conjunction with the accompanying drawings, wherein.

DETAILED DESCRIPTION OF THE INVENTION

The present invention provides a method and an apparatus for installing an elastomeric seal in a mounting groove in a manner that will be non-interfering or have minimal interference with the seal's comating surface during installation thereby avoiding damaging the seal. The method of installation does not require active external mechanical compression to be applied to the seal in order to prevent fluid passage through a gap between the seal and the comating surface. Furthermore, the method provides a novel method of preloading the seal prior to retention of pressure by the seal. In addition, the installed seal can readily conform to locally varying gaps, as well as compensate for shrinkage and/or creep due to variations in rubber volume, without having to apply additional external pressure. The disclosed method for installing the seal allows the seal to be set multiple times without damage to the seal.

Figure 1:
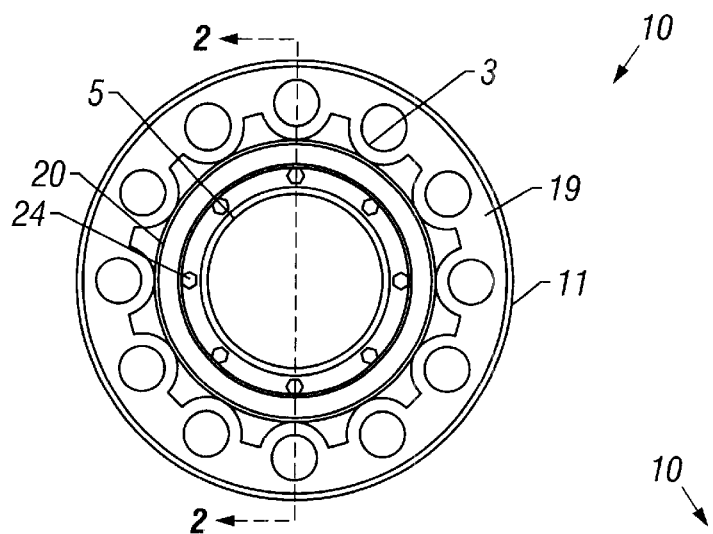
FIG. 1 shows an end view of a mechanically-operated tubular pipeline end clamp.
Figure 2:
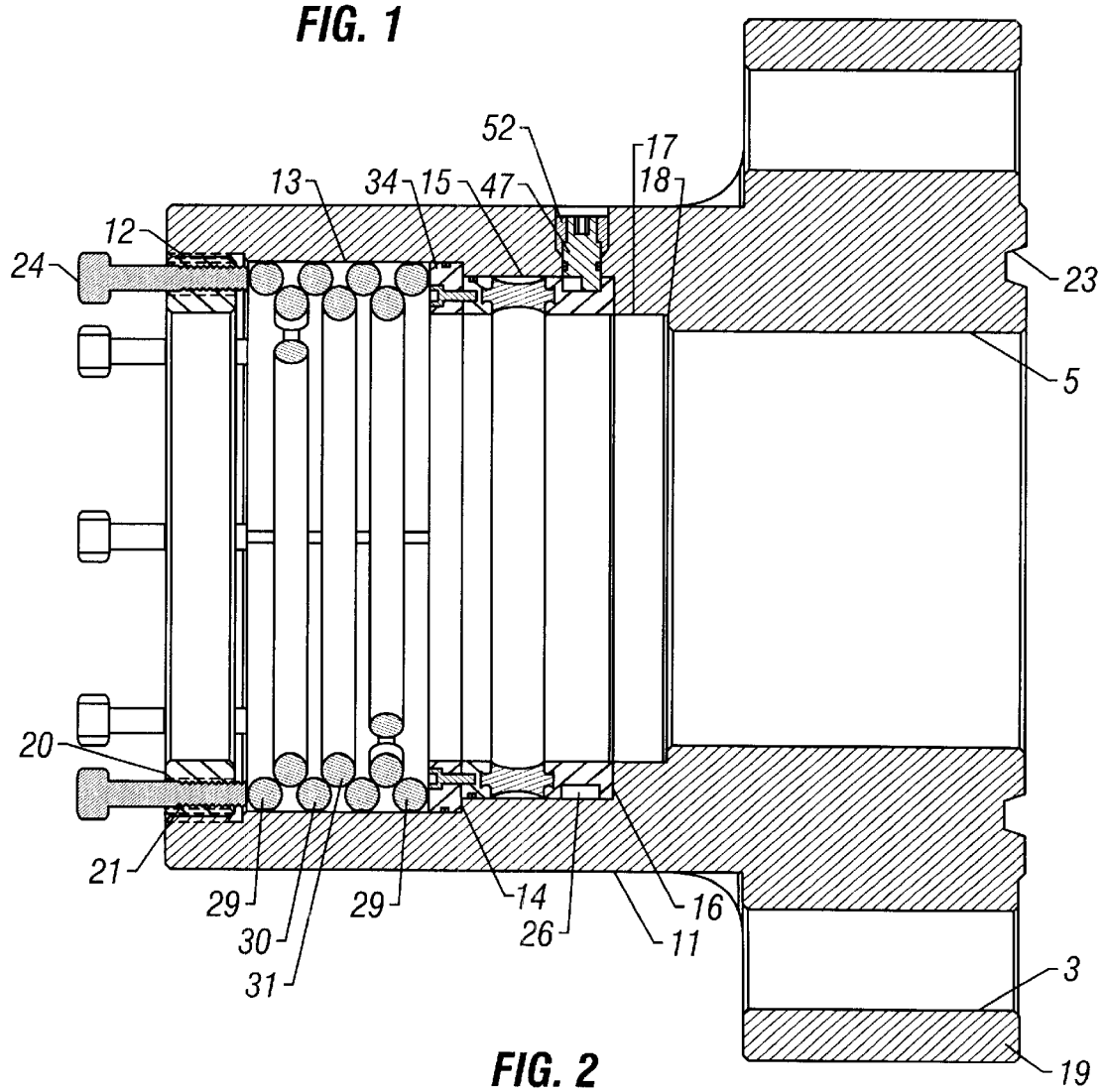
FIG. 2 shows a longitudinal sectional view of the clamp shown in FIG. 1 with a stretched symmetrical elastomeric seal.

Referring now to the drawings, and initially to FIGS. 1 and 2, it is pointed out that like reference characters designate like or similar parts throughout the drawings. The Figures, or drawings, are not intended to be to scale. For example, purely for the sake of greater clarity in the drawings, wall thickness and spacing are not dimensioned as they actually exist in the assembled embodiment.

FIGS. 1 and 2 illustrate a mechanically-operated tubular pipeline flanged end connector clamp 10. FIG. 1 shows an end view of clamp 10 and FIG. 2 shows a longitudinal half-sectional view of clamp 10 shown in FIG. 1.

The type of clamp shown is suitable for connecting to the end of a section of pipe in a pressure-retaining, non-separating state. The internal elements of clamp 10 which are used to grip and seal to the exterior of a piece of pipe are housed within circular tubular body 11. Housing 11 has a female thread 12 at its outer end and smooth first counterbore 13 inwardly positioned from and adjacent to thread 12. First transverse shoulder 14 is located at the inner end of first counterbore 13 and provides a transition between first counterbore 13 and smooth second counterbore 15.

Second transverse shoulder 16 is located at the inner end of second counterbore 15 and provides a transition from the second counterbore 15 to third counterbore 17, which is sized to admit the end of a specific diameter of pipe. Transverse shoulder 18 provides an abutment against which a pipe end may be positioned. Shoulder 18 is positioned between counterbore 17 and the through bore 5 of housing 11.

Flange 19 is provided with a circle of bolt holes 3 and is located in a transverse position at the outer end of housing 11 opposite the end with female thread 12. Flange 19 provides a simple mechanical connection means for attachment to other flanges; a groove 23 for a metal seal gasket is located on the end face of the flange.

Short annular cylindrical reaction abutment 20 is externally threaded and is threadedly engaged with female thread 12 of the body 11. The inner diameter of reaction abutment 20 is approximately that of the counterbore 17 of housing 11. Reaction abutment 20 is provided with a circle of threaded bolt holes 21. The axes of the holes 21 are parallel to the axis of reaction abutment 20. Hex-headed half-dog machine screws 24 are threadedly engaged in holes 21 so that their heads are externally accessible for wrenching when a pipe segment is positioned in the bore of clamp 10. Half-dog screws are used so that minor mushrooming of the screw tips under compressive loads will not prevent their retraction.

Figure 4:
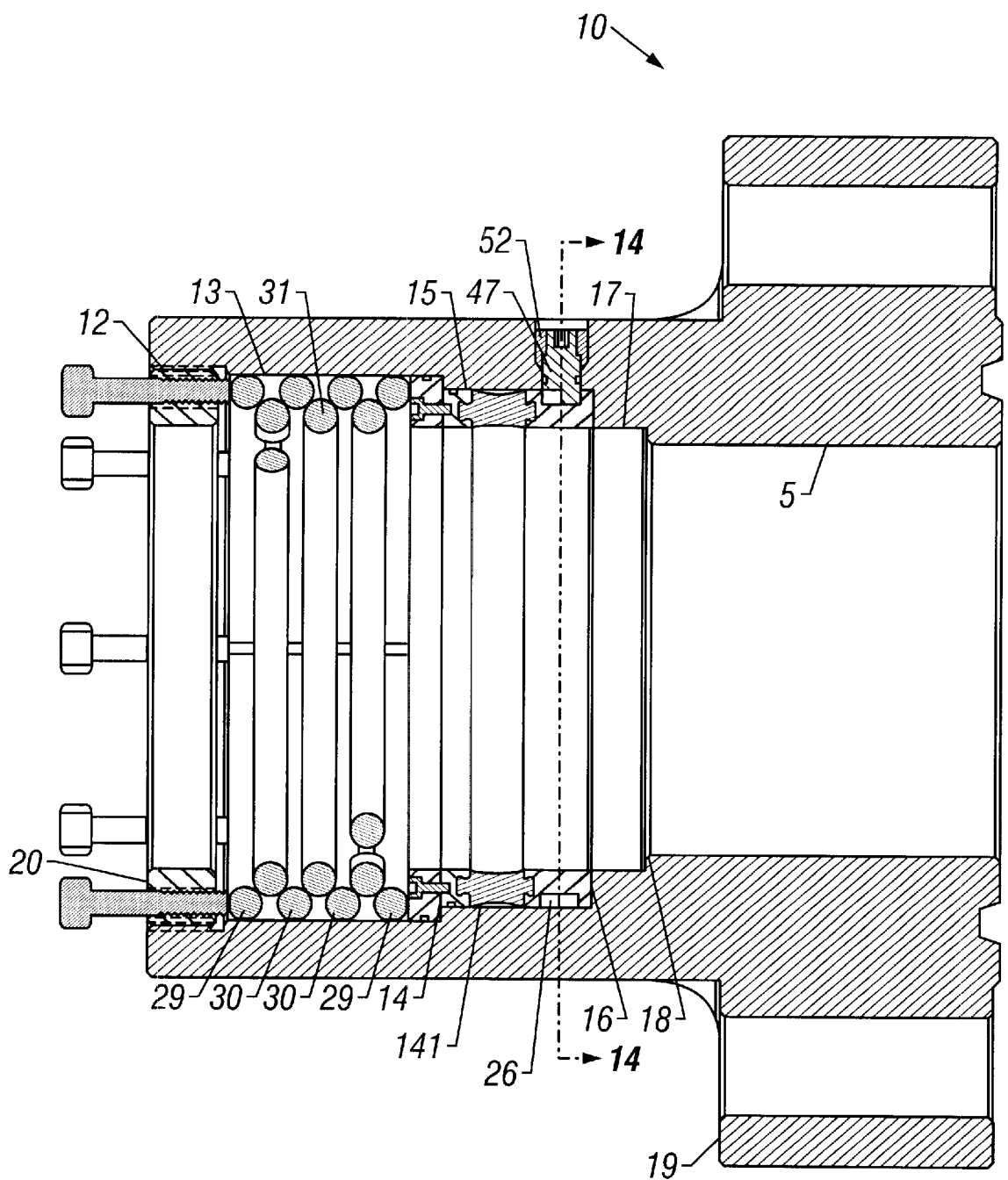
FIG. 4 illustrates a longitudinal sectional view of a mechanically-operated tubular pipeline with a stretched unsymmetrical elastomeric seal.

An array of multiple, coacting gripping elements, illustrated in FIG. 4, are positioned in first counterbore 13 inwardly from the reaction abutment 20. The array of coacting gripping elements consists of outer end rings 29, outer central rings 30, and inner split rings 31. The configuration of and interrelationship of these coacting gripping elements is further described in a copending U.S. patent application.

Figure 3:
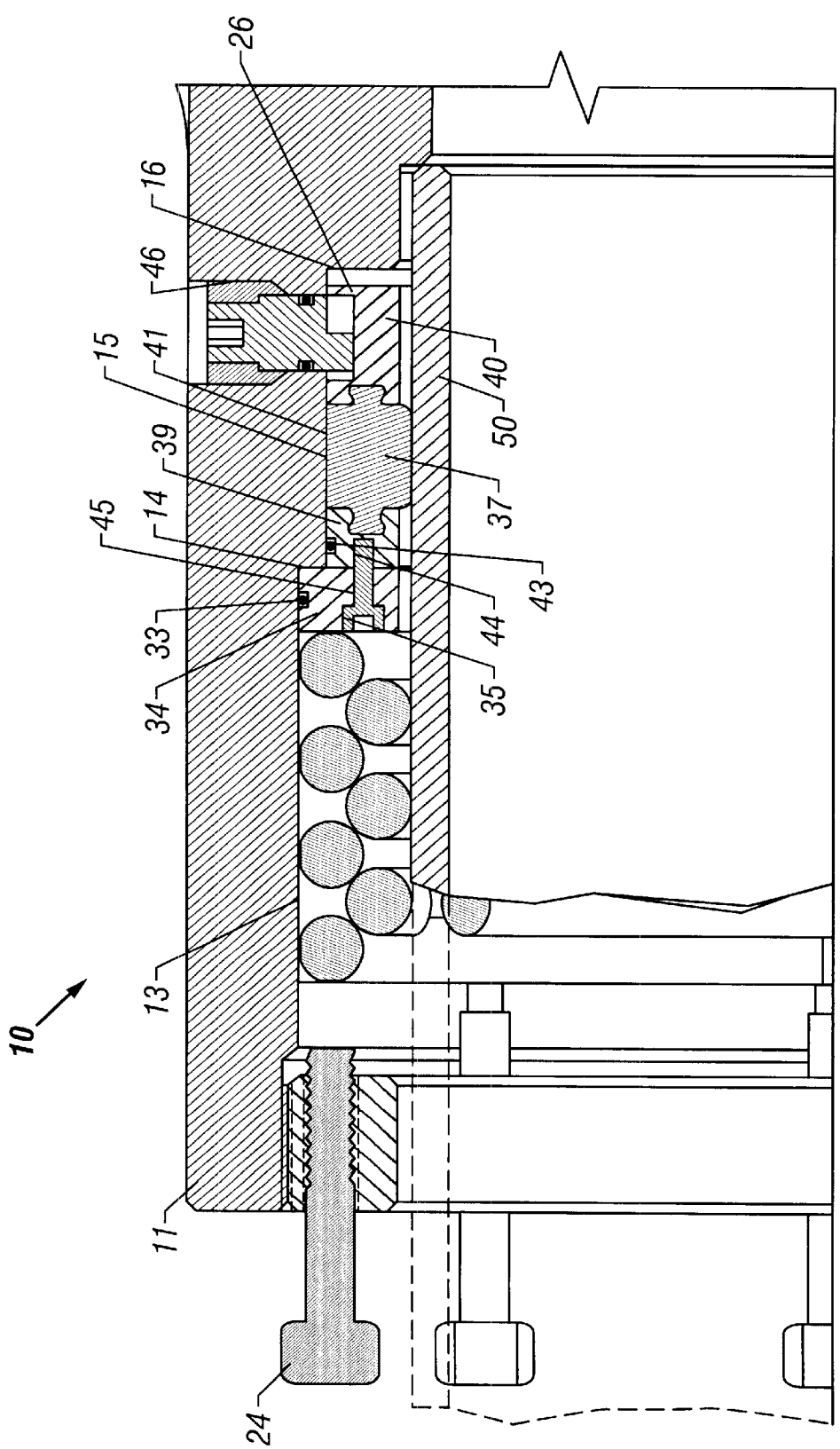
FIG. 3 illustrates a partial longitudinal quarter section of the clamp shown in FIG. 1 with a gripping (or engaged) symmetrical elastomeric seal.

Outer end rings 29 and outer central rings 30 may or may not be split. The outer end rings 29 and 30 are sized to slidingly fit against the cylindrical surface of the first couterbore 13 with a slip fit or low resistance to movement in the direction of the axis of clamp 10. As shown in FIG. 3, a flat face transverse to the ring axis is provided on the outer end rings 29 for reducing contact stresses for axial loads. Additionally, a cylindrical outer surface is provided on outer end rings 29 and outer central rings 30 to reduce contact stresses between said rings and the first counterbore 13.

Inner split rings 31 have a smaller ring centerline diameter than the outer end rings 29 or outer central rings 30. The inner diameter of split inner rings 31 is approximately that of counterbore 17 of housing 11. The arrangement of the array of rings is such that the stack of rings sequentially alternates between individual outer and inner rings. All the rings are constructed of high yield stress metallic material so that high contact stresses and significant bending of the inner split rings 31 will not produce plastic deformation of the ring surfaces.

The materials of construction for all of the clamp and seal embodiments are steel or other suitable metallic materials unless otherwise noted. The elastomeric components of these embodiments such as seal elements and O-rings are normally nitrile or Viton™ or other suitable rubbers.

Figure 5:
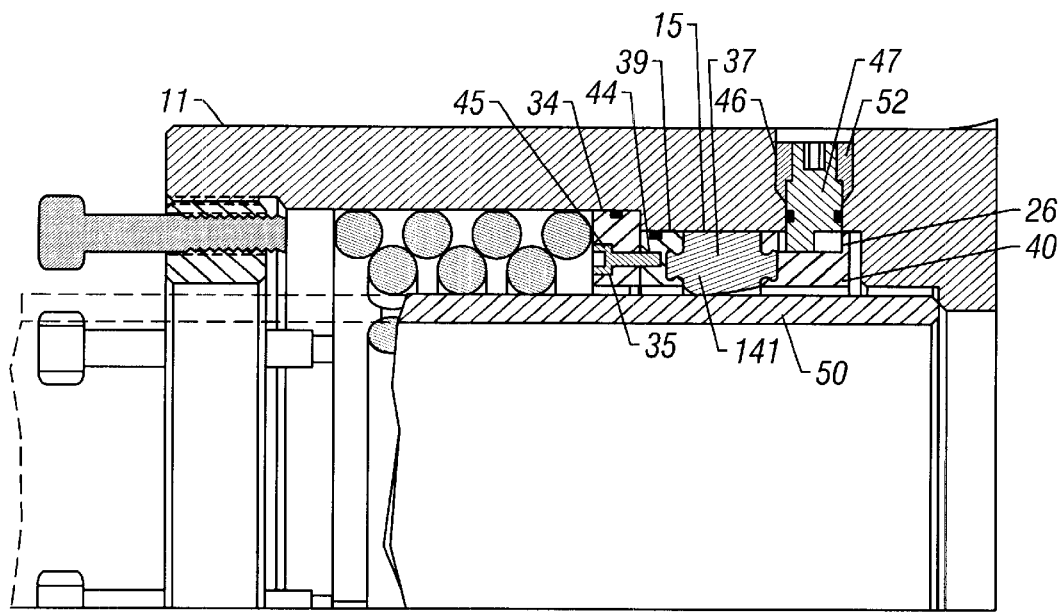
FIG. 5 shows a partial longitudinal section of the clamp shown in FIG. 4 with an engaged unsymmetrical elastomeric seal.

At the inner end of first counterbore 13 and positioned between the array of gripping elements and the first transverse shoulder 14 is an annular cylindrical seal anchor 34 (as shown in FIGS. 3 and 5), which has a male O-ring groove on its outer cylindrical diameter in which O-ring 33 is mounted to seal against first counterbore 13. Seal anchor 34 abuts first transverse shoulder 14. A circle of multiple counterbored through bolt holes 35 parallel to the axis of seal anchor 34 is provided.

A seal assembly is positioned in the second counterbore 15 between seal anchor 34 and second transverse shoulder 16. FIG. 11A shows a first embodiment of the seal assembly 37. The seal of the first embodiment of this invention has a symmetric cross-section and is configured to retain pressure from the flanged side (internal pressure) better than external pressure.

Seal assembly 37 consists of static seal end 39, movable seal end 40, and elastomeric seal 41 molded integrally to the static and movable seal ends in a central position. FIGS. 2 and 3 shows the seal assembly 37 mounted in a mechanically-operated tubular pipeline flanged end connector clamp 10. Seal assembly 37 fits closely within second counterbore 15. The inner diameter of static seal end 39 is a short annular cylinder with a male O-ring groove 42 on its outer cylindrical surface, wherein O-ring 43 is mounted to seal against second counterbore 15. The outwardly facing transverse surface of static seal end 39 is provided with drilled and tapped holes 44 matching the countersunk through holes 35 of seal anchor 34. Machine screws 45 are mounted in through holes 35 to engage tapped holes 44 and thereby connect static seal end 39 to a fixed seal anchor 34.

Figure 11:
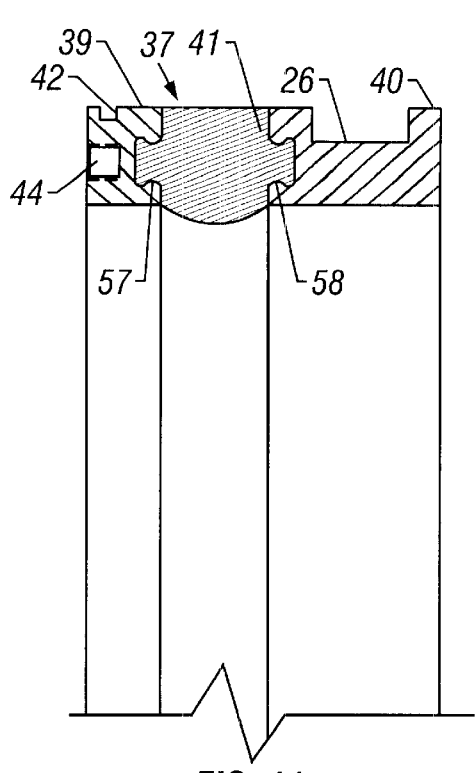
FIG. 11 shows a quarter sectional view of a molded seal assembly having a relaxed symmetrical elastomeric seal.

To assist in maintaining a good connection between the elastomer of seal 41 and static seal end 39 or anchored seal part 32 a strong bonding area is provided. This strong bonding area can be enhanced by having an undercut face groove 57 with rounded edges on the inside transverse face of static seal end 39 as shown in FIG. 11. Movable seal end 40 is a short annular cylinder with a face groove 58, similar to that of static seal end 39, on its outwardly facing transverse face. On its outer cylindrical face, movable seal end 40 has a deep circumferential groove 26 with end faces normal to the axis of the cylinder.

Referring to the as-molded seal configuration, shown in FIG. 11, elastomeric seal 41 is bonded to both the static seal end 39 and the movable seal end 40 during molding. The exposed outer surface of seal 41 is cylindrical when the seal is relaxed. The exposed inner surface of seal 41 is not cylindrical, but rather extends inwardly in a symmetrical arcuate or parabolic or polygonal cross-sectional projection, although its diameters adjacent to the seal ends 39 and 40 match the inner diameters of those pieces.

While the inner diameters of the static seal end 39 and the movable seal end 40 are approximately the same as counter bore 17 so that operating clearance is provided for installing the clamp 10 over a pipe end 50, the minimum diameter of the as-molded elastomeric seal 41 when it is relaxed is significantly less than the minimum outer diameter of the pipe. The result will be an interference fit between the elastomeric seal 41 in its untensioned position and the pipe when the two are mated, as shown in FIG. 3. When the elastomeric seal 41 is stretched for installation, as shown in FIG. 2, the tension maintained on the elastomer cross-section is sufficient to reduce the cross-sectional thickness of the elastomeric seal 41 so that tendencies to interfere with insertion of a pipe 50 into the clamp 10 are minimized. Consequently, elastomeric seal 41 will be less susceptible to damage during pipe insertion.

Figure 14:
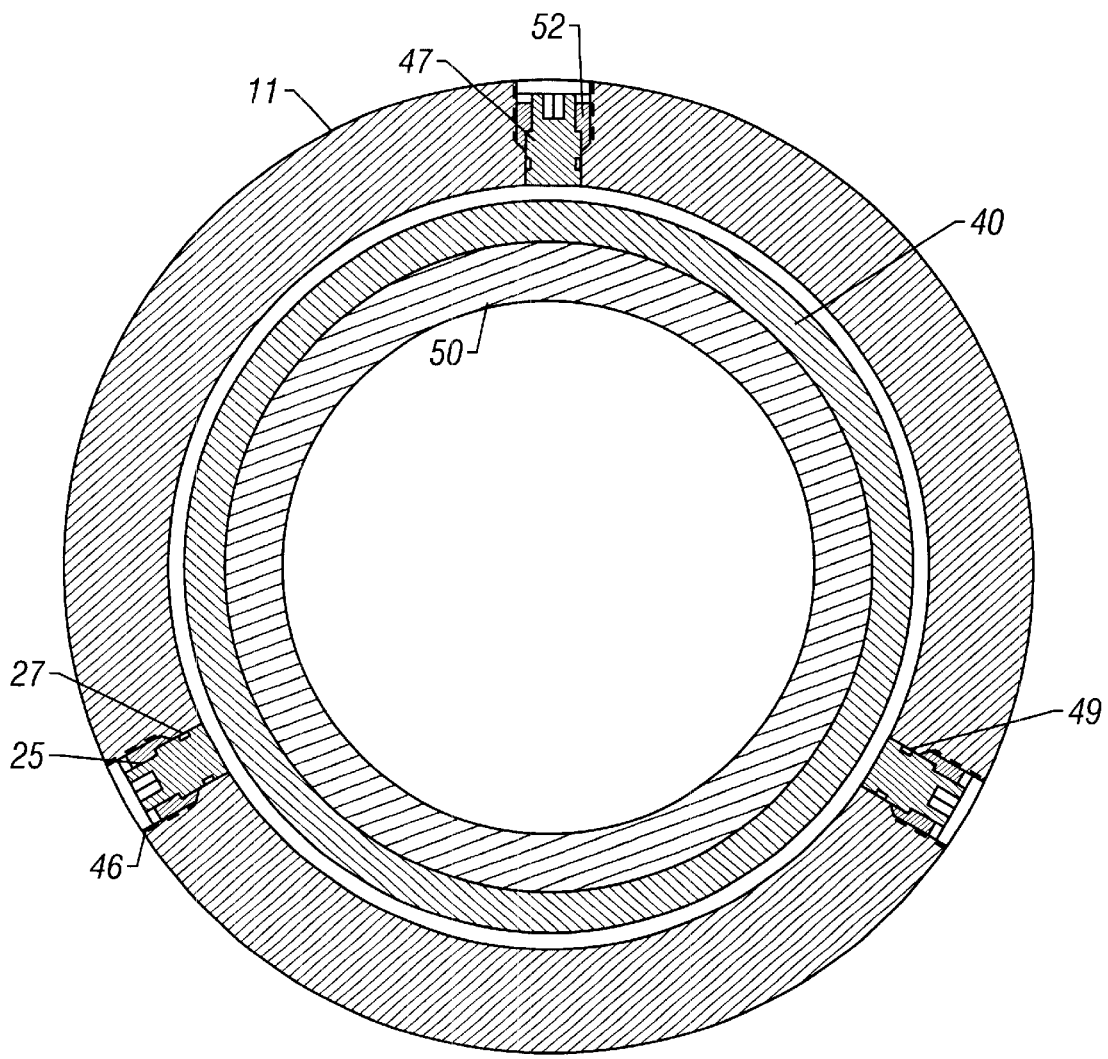
FIG. 14 is a cross-sectional view taken along line 14—14 of FIG. 4.

Multiple equispaced radial cam holes 46, as shown in FIGS. 3 and 14, with their axes in a common plane transverse to the housing axis penetrate the wall of housing 11 in the region of second counterbore 15. The cam axes are located slightly outward of the inner transverse shoulder of the deep circumferential groove 26 on the outer cylindrical face of the movable seal end 40 when the elastomeric seal 41 is in its untensioned position. The outer portion of each radial hole 46 is tapped and the inner end has a smooth inner bore with a tapered lead-in to permit engagement of an O-ring seal.

Figure 6A:
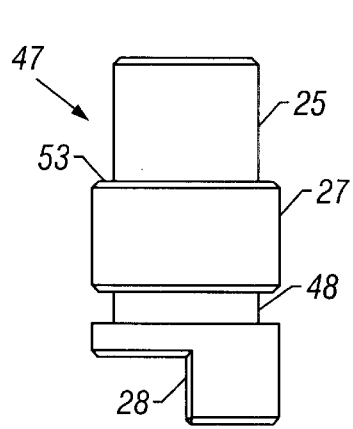
FIG. 6A is a side view of a cam.
Figure 6B:
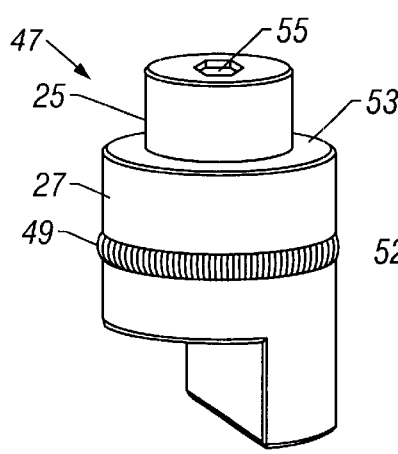
FIG. 6B is a perspective view of a cam.
Figure 6C:
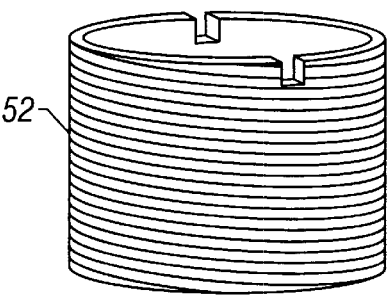
FIG. 6C is a perspective view of a hollow retainer screw.

Identical cams 47 are mounted respectively in each radial hole 46. A side and a perspective view of cam 47 is shown in FIGS. 6A and 6B respectively. Cam 47 has a cylindrical outer end body 25 of a first diameter, cylindrical inner end body 27 of a larger second diameter, with a transverse planar shoulder 53 at the transition in diameters, and wrench socket 55 in its outer end. O-ring groove 48 is positioned in the midsection of the cylindrical inner end body 27 to hold O-ring 49. O-ring 49 seals against the smooth inner bores of radial holes 46. Hollow retainer screws 52 are engaged into the threads of radial holes 46 to react against the transverse planar shoulders 53 of cams 47 so that the cams are retained in housing 11.

The innermost machined ends 28 of the cams 47 are machined away so that the body of each cam is removed on one side of a diametric plane to a depth slightly more than the deep circumferential groove 26 on the external cylindrical surface of movable seal end 40. The positioning of the machined ends 28 of cams 47 into groves 26 of movable seal end 40, as illustrated in FIGS. 2 and 3, create cylindrical operating surfaces for camming action on the inner transverse end of groove 26.

As shown in FIG. 2, the cams 47 are rotated so that their cylindrical camming surfaces are on the inward side of their respective axes and reacting against the inward transverse shoulder of the deep circumferential groove 26 of movable seal end 40, thereby tensioning the seal assembly 37. FIG. 3 shows the same seal assembly as in FIG. 2, but with the seal assembly 37 released from its tensioned installation position so that the seal assembly has assumed an engaged, preloaded position against a pipe end segment 50.

Figure 12A:
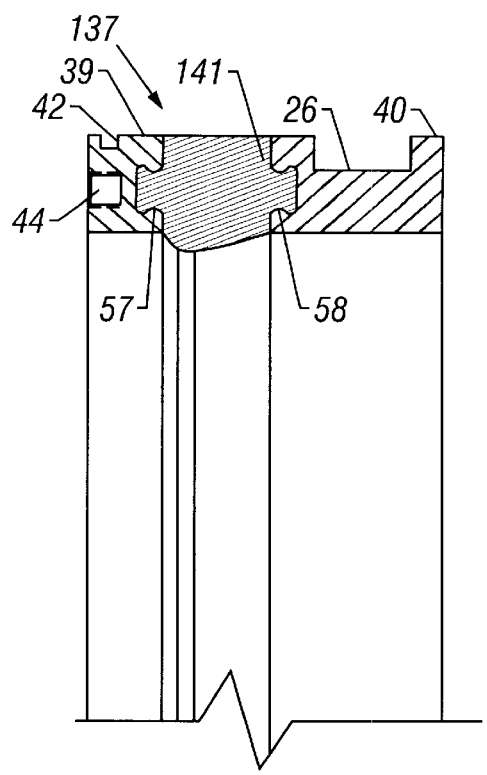
FIG. 12A shows a quarter sectional view of a molded seal assembly having a relaxed unsymmetrical elastomeric seal.

The second seal assembly 137, shown in FIG. 12A, is similar to that of the first, but has an unsymmetric seal cross-section which permits development of less pressure-biasing force on the seal/pipe interface. This seal is better suited for holding pressure from one direction than from the other direction. Since the tubular pipeline end connector clamp of FIG. 4 shown housing this second seal assembly 137 is identical to the tubular pipeline end connector clamp shown in FIG. 2 housing the first seal assembly 37, only the differences in the seal assembly are discussed herein.

As shown in FIG. 12A, the seal of the second seal assembly 137 consists of the same static seal end 39, the same movable seal end 40, and elastomeric seal 141 is molded integrally to the static and movable seal ends in a central position. The difference in the seal assemblies 37 and 137 is in the inner profile of the elastomeric seals 41 and 141. Seal assembly 137 also fits closely within second counterbore 15 as seen in FIGS. 4 and 5.

To assist in maintaining a good connection between the elastomer of seal 141 and static seal end 39 by providing additional bonding area and shear engagement, an undercut face groove 57 with rounded edges is provided on the inside transverse face of static seal end 39, and a similar face groove 58 is provided on the inside traverse face of movable end 40. Referring to the as-molded seal configuration, shown in FIG. 12A, elastomeric seal 141 is bonded to both the static seal end 39 and the movable seal end 40 during molding. The exposed outer diameter surface of seal 141 is cylindrical when the seal is relaxed. The exposed inner surface of seal 141 is not cylindrical, but rather extends inwardly in an unsymmetrical arcuate or polygonal cross-sectional projection, with its diameters adjacent to the seal ends 39 and 40 and matching the inner diameters of those pieces.

The inner diameters of the static seal end 39 and the movable seal end 40 are slightly more than the pipe outer diameter so that operating clearance is provided for installing the clamp 10 over a pipe end 50. The cross-section of elastomeric seal 141 has its cross-section sufficiently reduced by tension, as shown in FIG. 4, to ease insertion of pipe 50 and minimize potential seal damage. The unsymmetric profile of elastomeric seal 141 of this embodiment aids in maintaining a lower pressure bias force on the primary contact region between elastomeric seal 141 and pipe 50.

In FIG. 4, the elastomeric seal 141 is shown stretched for positioning during installation, while in FIG. 5 the elastomeric seal 141 is shown relaxed and sealing to pipe 50 inserted into the clamp 11. The minimum diameter of the as-molded elastomeric seal 141 is significantly less than the minimum outer diameter of the pipe. Therefore, when elastomeric seal 141 is relaxed there is an interference fit between the elastomeric seal 141 in its untensioned and unpressurized position and the pipe 50 when the two are mated.

Figure 12B:
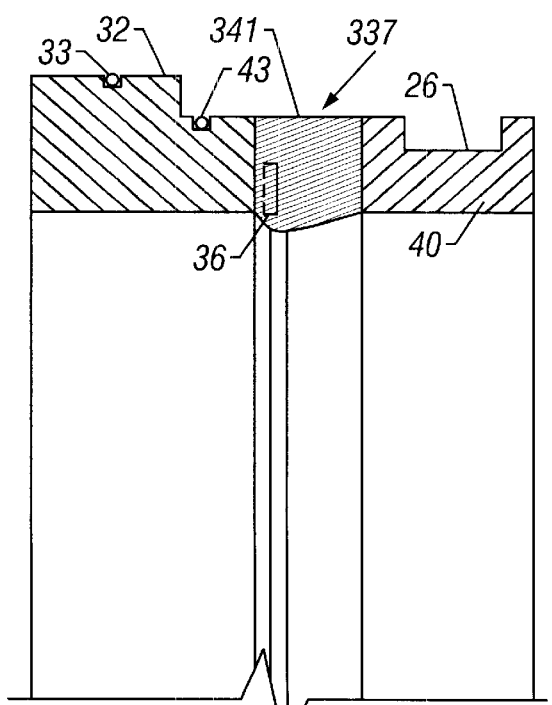
FIG. 12B shows a quarter sectional view of a molded seal assembly having a relaxed unsymmetrical elastomeric seal with an embedded antiextrusion device.

A similar, but alternative style of seal assembly is shown in FIG. 12B. In seal assembly 337, seal anchor and static seal end are combined into a single anchored static seal part 32. Static seal part 32 has an O-ring 33 in a male groove on the lower end of static seal part 32 which corresponds to O-ring 33 in seal anchor 34. In addition, seal 341 is bonded to static seal part 32 and movable seal end 40 without the undercut face grooves.

In addition, seal 341 is shown with an antiextrusion device 36 embedded in and bonded to the elastomeric matrix of seal 341. Antiextrusion device 36 is described in more detail in a concurrently pending patent application filed Feb. 19, 2001 and entitled "Antiextrusion Device" which is incorporated herein by reference. A preferred antiextrusion device is a corrugated rigid material, positioned with the midplane of its corrugations normal to the mating seal surface and parallel to the midplane of the seal groove. The antiextrusion device 36 is preferably integrally molded into or onto the low pressure side of the seal 341. Seal 341 may also have a substance having a high friction coefficient, such as silica flour, embedded in its inner surface that will comate with the object being gripped.

A third embodiment of a seal assembly 237 is a bidirectional seal which can retain pressure equally well from either direction. Seal assembly 237 is shown as molded in FIG. 13. Seal assembly 237 is mounted in a hydraulically-operated tubular pipeline end connector clamp shown in FIGS. 7, 8, 9, and 10. The tubular clamp 210 shown for this embodiment is similar in most respects to clamp 10 shown in FIGS. 2 and 4 and appears identical in its end view to tubular clamp 10 shown in FIG. 1. However, tubular clamp 210 differs in the means of tension application used for stretching the seal 241. It should be noted that any of the seals shown in FIGS. 11, 12A, 12B, or 13 can be adapted as either the cam-operated or the hydraulically-operated actuator.

The internal elements of clamp 210 which are used to grip and seal to the exterior of a piece of pipe 50 are housed within the circular tubular extension to clamp housing 211. Housing 211 has a female thread 212 at its outer end. A smooth first counterbore 213 is inwardly positioned from and adjacent to thread 212. Internal thread 214 is located at the inner end of first counterbore 213 and has a smaller minor diameter than that of first counterbore 213, as well as a thread relief at its inner end.

Smooth second counterbore 215 is located immediately adjacent to and inside of internal thread 214. Transverse shoulder 216 is located at the inner end of second counterbore 215 and provides a transition from the second counterbore 215 to short third counterbore 217. Transverse pipe stop shoulder 218 provides a transition from third counterbore 217 to housing throughbore 219. Short annular cylindrical reaction abutment 20 is externally threaded and is threadedly engaged with female thread 212 of the body 211. This component and hex-headed half-dog machine screws 24 are identical to the items used in pipe clamp 10.

Figure 7:
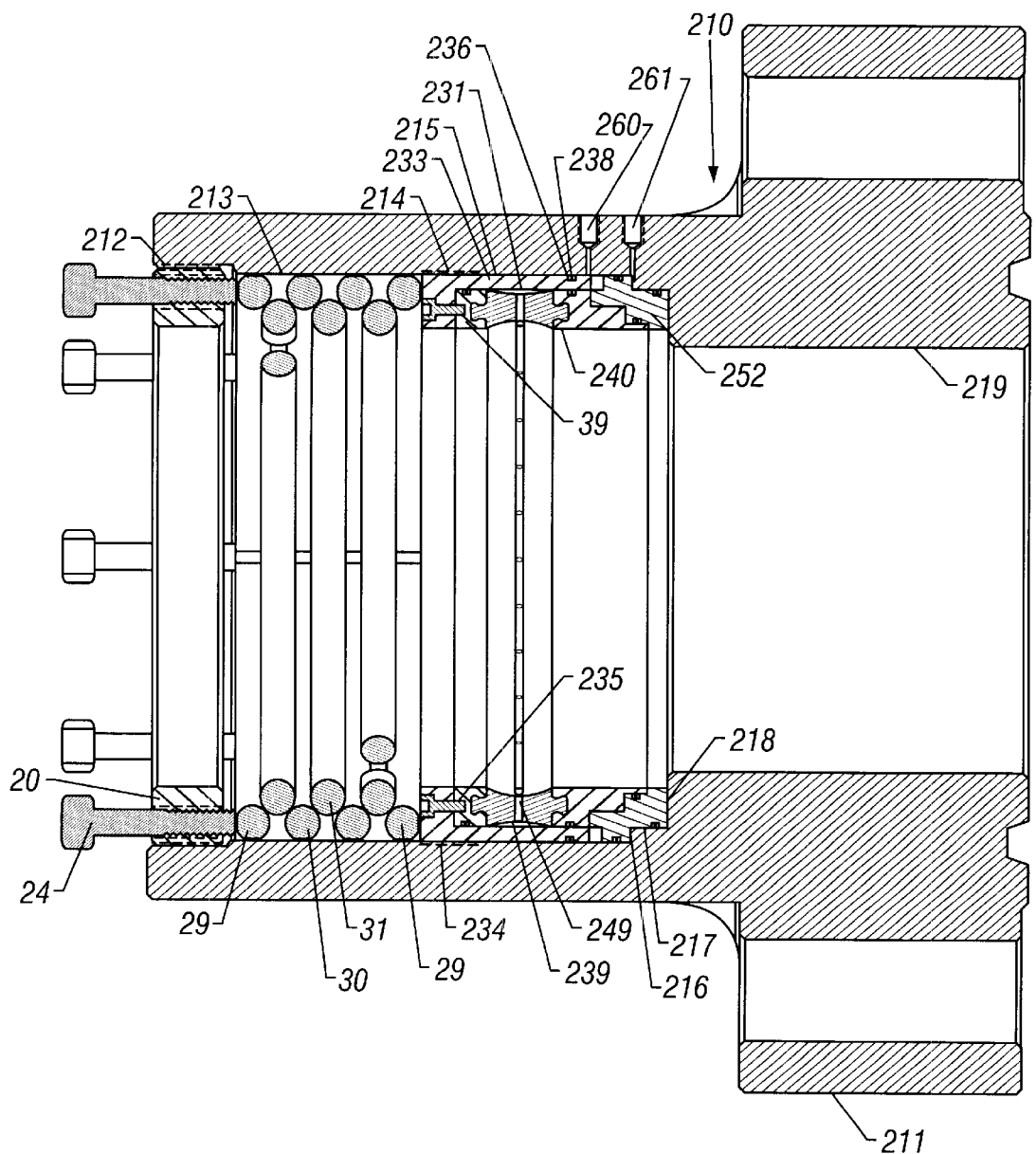
FIG. 7 shows a longitudinal half sectional view of a mechanically-operated tubular pipeline end clamp with a stretched elastomeric seal suitable for bidirectional sealing.

FIG. 7 shows an array of multiple, coacting gripping elements consisting of outer end rings 29, outer central rings 30, and inner split rings 31, as described above and illustrated in FIGS. 2 and 4, positioned in first counterbore 213 inwardly from the reaction abutment 20.

At the inner end of first counterbore 213 and positioned at the inner end of the array of gripping elements is annular seal anchor 233. Seal anchor 233 is generally cylindrical with a deep counterbore 231 on its inner end as shown in FIGS. 7,8,9 and 10. External thread 234 is positioned on the outer end of seal anchor 233 and is threadedly engaged with internal thread 214.

A circle of multiple counterbored through bolt holes 235, parallel to the axis of seal anchor 233, is provided through the outer transverse wall of seal anchor 233 between the outer end and counterbore 231 of seal anchor 233. A male O-ring groove 236 is provided on the exterior cylindrical surface of seal anchor 233, wherein O-ring 238 is mounted. O-ring 238 seals between second counterbore 215 and the outside of seal anchor 233.

Figure 13:
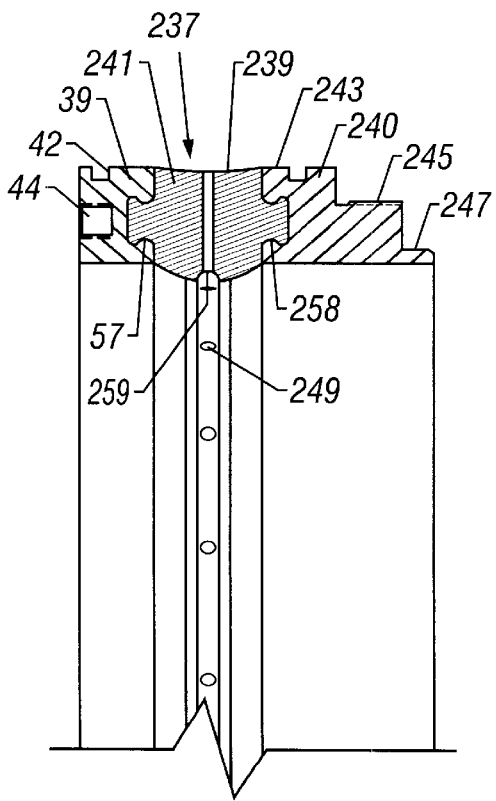
FIG. 13 shows a quarter sectional view of a molded seal assembly having a relaxed elastomeric seal suitable for bidirectional sealing.

Seal assembly 237, shown in its as-molded condition in FIG. 13, consists of static seal end 39, movable seal end 240, and elastomeric seal 241 molded integrally to the static and movable seal ends in a central position. Static seal end 39 is basically the same as in the first and second seal assemblies.

The positioning of seal assembly 237 in the housing 211 is shown in FIGS. 7,8,9 and 10. Seal assembly 237 fits closely within the deep counterbore 231 on the inner end of seal anchor 233. Static seal end 39 is a short annular cylinder with a male O-ring groove 42 on its outer cylindrical surface, wherein O-ring 43 is mounted to seal against the counterbore on the inner end of seal anchor 233. The outwardly facing transverse surface of static seal end 39 is provided with drilled and tapped holes 44 matching the countersunk through holes 235 of seal anchor 233. Machine screws 45 are mounted in through holes 235 to engage tapped holes 44 and thereby connect static seal end 39 to the fixed seal anchor 233.

To assist in maintaining a good connection between the elastomer of seal 241 and static seal end 39 by providing additional bonding area and shear engagement, an undercut face groove 57 with rounded edges is provided on the inside transverse face of static seal end 39. Movable seal end 240 has a face groove 258 similar to that of static seal end 39 on its outwardly facing transverse face.

Figure 9:
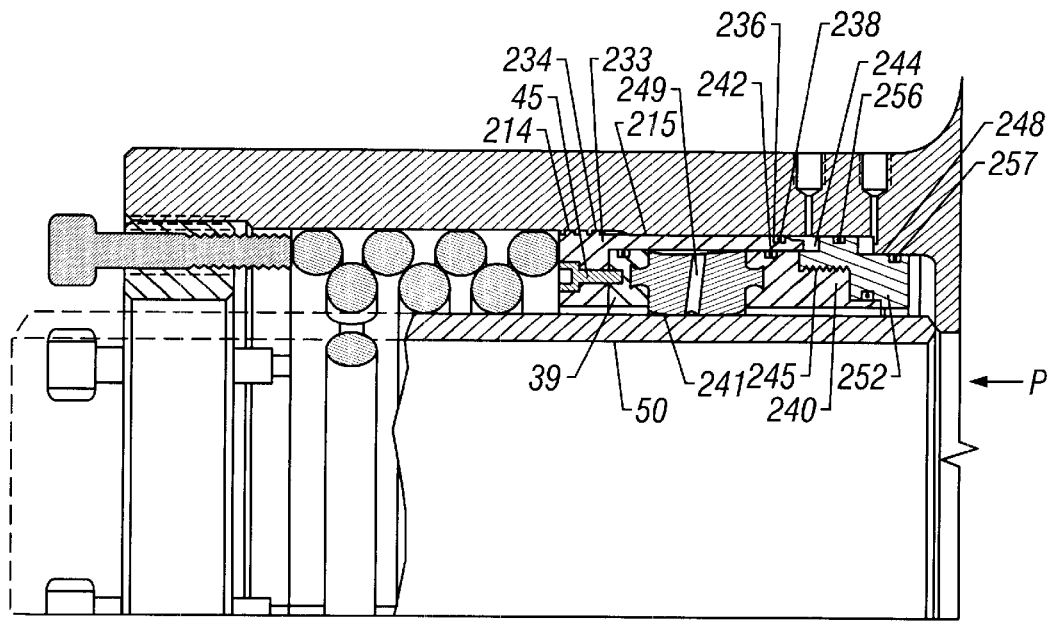
FIG. 9 illustrates a partial view of the clamp shown in FIG. 8 retaining internal pressure.
Figure 10:
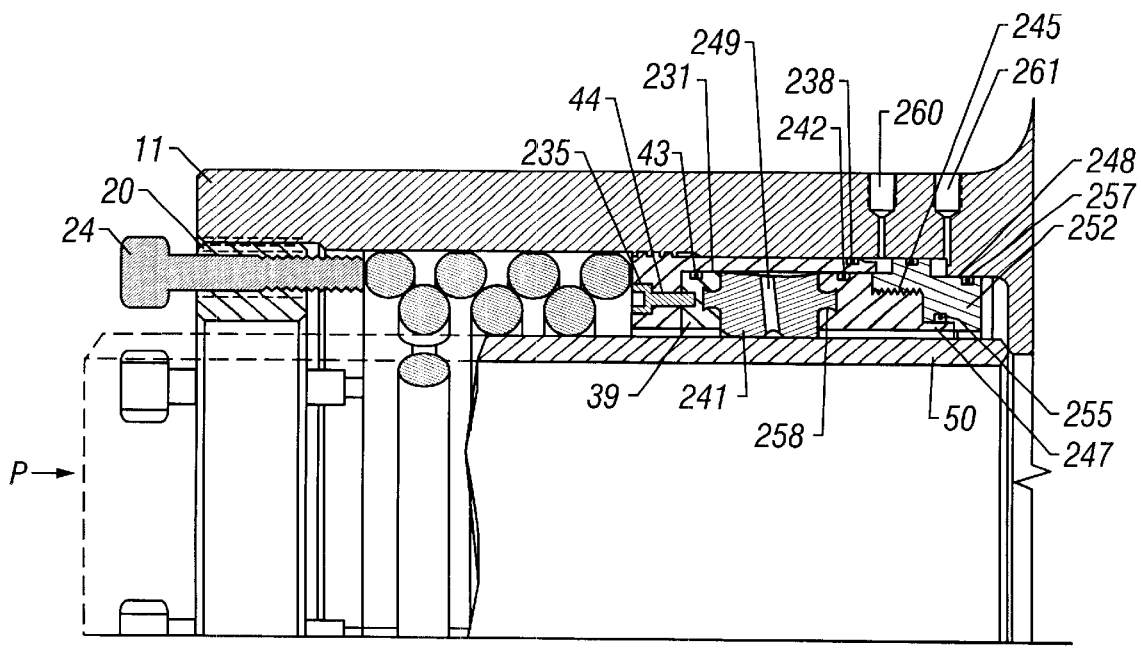
FIG. 10 illustrates a partial view of the clamp shown in FIG. 8 retaining external pressure.

As seen in FIGS. 9 and 10, the outer cylindrical surfaces of movable seal end 240 are stepped in diameter. The first cylindrical section 243, located on the outer end, has the largest diameter. First cylindrical section 243 has a male O-ring groove centrally positioned on its cylindrical face and containing O-ring 242 which seals to counterbore 231. Located inwardly from the first cylindrical section 243 of movable seal end 240 is a reduced diameter second cylindrical section 245 with a male thread and a thread relief adjacent to a transverse shoulder between the first and second cylindrical sections. A short third cylindrical section 247 having an outer diameter smaller than that of the second section is located at the inner extremity of movable seal end 240.

Figure 8:
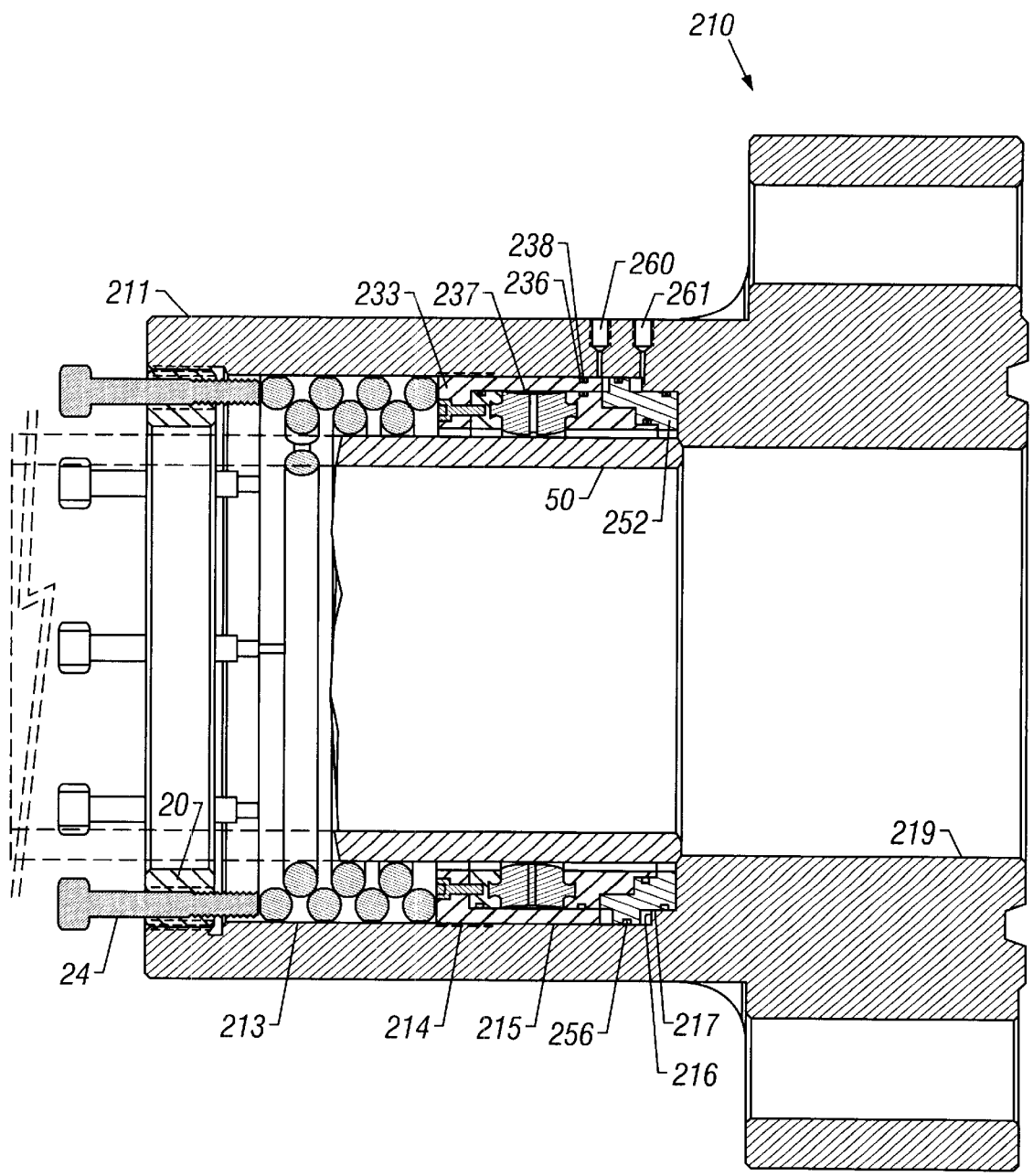
FIG. 8 shows a longitudinal half sectional view of the clamp shown in FIG. 7 with a engaged elastomeric seal suitable for bidirectional sealing.

A transverse shoulder is provided between the second and third cylindrical sections. The through bore of movable seal end 240 has a constant diameter equal to the clearance bore to accommodate the pipe to be gripped by pipe clamp 210. The elastomeric seal 241 of seal assembly 237 is bonded to both the static seal end 39 and the movable seal end 240 during molding. The elastomeric seal 241 has a symmetric configuration. When the seal is relaxed as seen in FIG. 8, the exposed outer diameter surface of seal 241 is generally cylindrical, but with a central annular groove 259. The exposed inner surface of seal 241 is not cylindrical, but rather extends inwardly in a smooth curve to two symmetric cusps separated by central annular groove 259. The inner diameters of the cusps next to annular groove 259 are smaller than those of the seal ends 39 and 240, while the elastomeric seal diameters adjacent to the seal ends 39, 240 match the inner diameters of those pieces.

The inner diameters of the static seal end 39 and the movable seal end 240 are slightly larger than the outer diameter of pipe 50 so that an operating clearance is provided for installing the clamp 210 over a pipe end 50. The minimum diameter of the as-molded elastomeric seal 241 is significantly less than the minimum outer diameter of the pipe 50. The result will be an interference fit between the elastomeric seal 241 in its untensioned position and the pipe 50 when the two are mated, as shown in FIG. 8. On the other hand, when the elastomeric seal 241 is stretched for installation, as shown in FIG. 7, the tension maintained on the elastomer cross-section is sufficient to reduce the inward protrusion of the elastomeric seal 241 so that tendencies to interfere with insertion of a pipe 50 into the clamp 210 are minimized. At the same time, elastomeric seal 241 will be less susceptible to damage during pipe insertion.

Multiple radial connecting ports 249 hydraulically communicate between the inner 239 and outer 259 annular grooves of elastomeric seal 241. The chamber formed with external groove 239 on the exterior cylindrical face of elastomeric seal 241 between the seal and the cylindrical counterbore face 231 of seal anchor 233 and isolated between O-rings 43 and 242 only communicates with the inner groove of the seal through ports 249.

Piston 252 has an annular construction and is positioned inwardly from movable seal end 240. The extreme outer diameter of piston 252 is a cylindrical surface carrying a male O-ring groove in which O-ring 256 is positioned so that it can seal between piston 252 and second counterbore 215.

A first reduced outer diameter cylindrical section 244 on the outer end of the largest diameter section of piston 252 is sized to slide freely within the counterbore 231 of seal anchor 233. A second reduced outer diameter cylindrical segment 248 is positioned on the inner side of the piston 252 and is sized to closely fit within third counterbore 217 of housing 210.

A male O-ring groove is positioned near the inner end of the second reduced outer diameter cylindrical segment, with O-ring 257 positioned therein and sealing against third counterbore 217. The first counterbore on the outer end of piston 252 has a female thread with a thread relief, by which piston 252 is connected to the thread on the inner end of movable seal end 240. A smaller second counterbore with a female O-ring groove is positioned inwardly of the thread and outwardly of the through bore of piston 252. O-ring 255 is positioned in the female O-ring groove to seal against the inward projection of the third cylindrical surface of movable seal end 240.

Piston 252 is thus configured to serve as a double-acting piston with an active area of the annulus between its extreme outer diameter and its first and second reduced outer diameters. Hydraulic ports 260 and 261 are threaded and provide flow passages through the wall of housing 211 to permit connection with the piston chambers on the outer and inner ends of piston 252, respectively. Hydraulic ports 260 and 261 are controlled by selectably operable valving.

FIG. 7 shows the pipe clamp 210 with the elastomeric seal 241 in a stretched position for installation, while FIG. 8 shows the clamp 210 with a pipe segment 50 in its bore and seal 241 untensioned so that it is presqueezed against the pipe 50, but unpressurized. While seal 241 is stretched, the pipe 50 is inserted into the through bore of clamp 210 until its end abuts pipe stop shoulder 218. FIG. 9 shows the same situation as for FIG. 8, but with the seal retaining internal pressure. FIG. 10 corresponds to FIG. 9, but with the seal retaining external pressure.

Operation of the Embodiments of the Invention:

The clamp 10 holding the first embodiment of the seal assembly 37 having a symmetric unidirectional seal is shown in its configuration for receiving the installation of a pipe into its bore in FIG. 2. In this arrangement, the elastomeric seal element 41 is held in a stretched position by the cams 47 which are rotated to cause the movable inward end 40 of the seal assembly 38 to be forced inwardly (to the right) in the bore of housing 11. The attendant decrease in cross-sectional inward protrusion of elastomeric seal 41 is due to the stretching of the seal. This decrease in inward protrusion causes elastomeric seal 41 to readily clear the outer diameter of a pipe inserted into the clamp for sealing.

During installation of the pipe, the half-dog machine screws 24 are loosely adjusted against the set of clamping rings 29, 30, and 31 so that the rings will freely clear the outer diameter of a pipe or pipes inserted into the clamp bore. After a pipe 50 is positioned within the bore of the clamp as shown in FIG. 3, the half-dog machine screws 24 on each end of clamp 10 are tightened so that the inner rings 31 are forced inwardly as the ring stack is compressed. A prescribed torque is then applied evenly to the screws 24 in order to maintain rings 31 strongly forced against pipe 50 and thereby to obtain a strong frictional grip on the pipe. After the pipe is gripped securely by the gripping rings, cams 47 are rotated 180 degrees from their installation position, thereby freeing elastomeric seal 41 to attempt to return to its unstretched position. Because the radial thickness of elastomeric seal 41 is monotonically reduced from its smallest diameter to its inner end where it is bonded to movable seal end 40, the released seal will smoothly fill the annular seal gap from where it first rebounds against the pipe up to the point at which interference ceases. This ensures high presqueeze without voids.

The diameter and ovality of pipe 50 are made to lie within a known range, such range tightly controlled by factory tolerances. Thus, the inner diameter of the seal can be molded sufficiently smaller than the minimum pipe size to ensure an interference fit with the pipe. In the process of attempting to return to its molded shape from its stretched position, the elastomeric seal assumes a position such that it conforms to the local contours of the pipe 50 and presses strongly against it to effect a highly preloaded interfacial contact ('presqueeze').

If pressure is retained by seal 41, it is permitted to reach the outer cylindrical surface of elastomeric seal by passing between clamp body 11 and movable seal end 40. This retained pressure on the outside cylindrical surface of the seal permits seal 41 to have a strong pressure bias tending to amplify interfacial contact forces between seal 41 and pipe 50. The gripping of the pipe 50 by the rings prevents the pipe from being forced out of the bore of clamp 10 by entrapped internal pressure forces acting on the pipe.

The seal assembly, as shown in FIG. 12A, includes an unsymmetrical elastomeric seal 141, wherein the primary contact zone (segment with minimal inner diameter as molded) is displaced to one side or the other of the middle of the seal section. As shown in FIGS. 4 and 5, this seal assembly 137 has its primary contact zone located closer to the low-pressure side of the seal. The primary contact zone generally has the highest interfacial contact forces to promote effective sealing. Varying the axial position of the primary contact zone of seal 141 relative to its midpoint does not appreciably influence the presqueeze on the seal, but does permit obtaining more or less pressure bias on the sealing interface with the pipe 50. This feature can prove advantageous for weaker seals, stiffer seals, or higher pressures. Provision of a smaller pressure bias area reduces pressure bias forces and thereby somewhat reduces extrusion tendencies for a seal of lesser elastomer stiffness or exposed to higher pressures. A larger pressure bias area provides more pressure force on the seal/pipe interface and thus assists in sealing with stiffer seals and lower pressures. Otherwise, seal assembly 137 operates substantially the same as seal assembly 37.

The symmetric seal of FIGS. 2, 3 and 11 and the unsymmetric seal of FIGS. 4, 5, 12A and 12B have seals that are primarily designed to seal against internal pressure. However, it should be noted that for the cam actuated stretching means of FIGS. 2, 3, 4, 5, and 14, the side of the cam 47 which is not cut away will shoulder against the outer end of groove 26 when the cam is in its unactuated position and the normal pressure condition is reversed (i.e., the pressure is external). When the cam 47 is shouldered against the outer end of groove 26, moving seal end 40 is not permitted to shift inwardly (to the right) sufficiently to cause elastomeric seal 41 to lose its presqueeze against the comating seal surface of pipe 50. In such an event, substantial reverse pressures are also sustainable by these unidirectional seal units 37 and 137, although the clearances between the uncut side of cam 47 in its unactuated position and the outer end of groove 26 necessitated by the variation in the diameter of pipe 50 will typically result in some play which lessens the presqueeze on elastomeric seal 41 or 141 due to some inward shifting of the moving seal end 40. Likewise, for hydraulically actuated seal using the mechanism of FIGS. 7, 8, 9, and 10, trapping hydraulic fluid and pressure by closing the valving controlling hydraulic port 261 makes the moving seal end 240 immobile so that the seal unit 237 is also able to resist reverse pressures.

The symmetric seal of FIGS. 2, 3, and 11 and the unsymmetric seal of FIGS. 4, 5, and 12A or 12B are configured to be radially inwardly pressure biased by pressure differentials in their normal pressure conditions with internal pressure from the flange side. This pressure biasing is effected by providing an isolated pressure path from the region of retained high pressure (to the right) to the outer diameter side of elastomeric seal 41. For the symmetric and unsymmetric seal units 37, the pressure path is between moveable seal end 40 and the housing 11. The region of the sealing interface between pipe 50 and elastomeric seal 41 is considered to start at the line of initial contact of the elastomer with the pipe on the high pressure side of the seal. A monotonic gradation in pressure between the high pressure and the low pressure across the seal exists across this region of the sealing interface. Accordingly, there will be a pressure differential between the outer diameter face which is exposed to the full high pressure and the inner diameter face of elastomeric seal 41 on the low pressure side of the initial high pressure line of contact. This pressure differential acts in a radially inward direction on the elastomeric seal 41 to compel higher interfacial pressures between the elastomer and the pipe 50, thereby enhancing the resistance of the sealing interface to escape of pressure through the interface. This condition is termed pressure bias for the seal.

In the case of reverse (i.e., external) pressures for the symmetric or unsymmetric unidirectional seals, the pressure bias is reversed, since the outer diameter face of elastomeric seal 41 is exposed to low pressure in such a case. The pressure bias then acts radially outwardly and tends to reduce the interfacial pressure between elastomeric seal 41 and pipe 50. However, the elastomer on the outer diameter face of elastomeric seal 41 is limited in its range of outward distortion by abutting against second counterbore 15 and moving seal end 40, which is held by the restraint of cam 47 against the outward end of groove 26. For the case of a unidirectional seal operated by the hydraulic piston means of FIGS. 7, 8, 9, 10, isolation of hydraulic pressure from closing port 261 similarly restrains the moving seal end. The result is that the reversal of the pressure bias has only a limited effect in reducing the interfacial contact pressures between the seals and pipe 50 from the interfacial contact pressures which would occur for seals which were not pressure biased.

The bidirectional elastomeric seal 241 of seal assembly 237 is shown mounted in a hydraulically-operated clamp 210 in FIGS. 7, 8, 9, and 10. This clamp 210 holds the elastomeric seal 241 in a stretched position for installation by maintaining hydraulic pressure from hydraulic port 260 on the outer side of piston 252 during installation, as is shown in FIG. 7, rather than relying upon cam action for tensioning.

Piston 252 is attached to movable seal end 240 by threads 245. Thus, the application of pressure to hydraulic port 260 causes seal 241 to be stretched. Gripping rings 29, 30, and 31 are uncompressed for installation in the same manner as for clamp 10 having any of the other seal assembly embodiments.

After a pipe segment 50 is positioned in the through bore of clamp 210, the gripping rings 29, 30 and 31 are tightened against the pipe and the hydraulic pressure applied to the outer side of piston 252 through port 260 is released, as indicated in FIG. 8. This permits elastomeric seal 241 to assume its preloaded position against the pipe in the same manner as described for seal assemblies 37 and 137. Additionally, hydraulic pressure may be applied temporarily as a final installation step to port 261 to urge the piston 252 outwardly, thereby assisting seal 241 in reaching a fully presqueezed condition in spite of high levels of contact friction between the pipe 50 and elastomeric seal 241.

When the internal pressure across the gap between pipe 50 and clamp 210 is higher than the external pressure, as is shown in FIG. 9, the pressure acting on seal 241 causes the inside cusp adjacent to the central annular groove 259 to lift from the pipe sufficiently to admit that pressure to reach the central annular groove 259, the multiple radial connecting ports 249, and the outer annular groove 239. At the same time, the outside cusp does not lift, so that the pressure is transmitted only to the outer cylindrical surface of the seal, where it is entrapped by O-ring seals. In this manner the entrapped pressure serves as a pressure bias to maintain a high interfacial contact force between the outside cusp and pipe 50. The same sequence of pressure entrapment occurs when the pressure is higher on the outside of the seal 241, as is shown in FIG. 10. The seal 241 will entrap and retain the highest pressure to which it has been exposed as a pressure bias on its outer diameter cylindrical face, ensuring good sealing even with pressure reversals or pressure cycling.

Advantages of This Invention:

Conventional seals for large gaps rely upon either: a) passive seals which are provided with an interference fit and are installed with the interference present during installation, or b) active seals which are not molded or formed to have an interference fit and are installed with no interference fit but are then actively compressed to cause interference with their comating surface. The present invention overcomes many of the problems encountered with conventional seals.

The advantages of this invention accrue primarily from: a) the molded shape of the elastomeric seal being larger than required to span the gap to be sealed so that an interference fit will occur between the seal and the comating surface to which it is to seal, b) stretching of the elastomer in the direction parallel to the surfaces forming the seal gap to sufficiently reduce its cross-section protrusion into the seal gap to avoid significant fit interference when the seal is being installed adjacent its comating seal surface, and c) releasing the installation tension on the elastomer in order to permit it to attempt to return to its as-molded shape and thereby assume a presqueezed condition against its comating seal surface. An optional subsequent step is to provide a temporary axial force to aid in urging the seal to return towards its unstretched position by overcoming friction against the elastomer.

Prestretching an elastomeric seal for its installation adjacent a comating seal surface so that its cross-section protrusion into the seal gap is reduced permits very high but controllable presqueezes for ensuring reliable sealing. While conventional passive seals for large gaps can also have a controllable presqueeze, their level of presqueeze is typically limited to keep the likelihood of installation damage at acceptable levels.

Having an elastomeric seal which is sized to always assume an interference fit against its comating seal surface in attempting to return to its molded shape following stretching ensures that the seal will always be sufficiently biased against its comating surface due to the locked-in stresses in the elastomer. This interfacial bias is maintained passively by the tendency of the elastomer to return to its molded shape. Thus, the interfacial biasing force of this invention is obtained by a means opposite that used by the active conventional methods for sealing large gaps described above, which must rely upon externally applied and maintained compression forces to distort into sealing engagement an initially unstressed elastomeric seal which is molded to a shape which will not significantly interfere with the comating surface during installation.

The installation of the seal assemblies described herein under tension ensures that the seals are always passively self-urged (i.e., without outside intervention) to have adequate presqueeze on the seal interface in spite of elastomer shrinkage or creep. This maintenance of proper presqueeze with shrinkage or creep is not feasible with either active or passive conventional large gap seals without actively recompressing the seal. Such recompression is often extremely costly to effect and/or impractical. Further, in contrast to the conventional large gap active seals, the level of presqueeze for the seals of this invention can be predetermined. The level of presqueeze for the described seal assemblies can be controlled by the selection of the general seal geometry, the type of elastomer compound, and the amount of interference fit. In contrast, conventional large gap active seals frequently are overcompressed by installation personnel when presqueeze is applied, with the result that the pipe may be locally necked down in an excessive manner. This situation is difficult to avoid with conventional seals, even when jack screw torsions are carefully controlled, since screw friction is highly variable and unknown.

In addition, the seal assemblies of the present invention have readily definable and, by design, controllable pressure biasing behavior for enhancing the reliability of sealing. In contrast, conventional seals for large gaps normally have simple rectangular cross-sections and are force-fitted or clamped into simple rectangular or near-rectangular grooves. The pressure bias for such conventional seals is difficult to control and is generally not an important factor in maintaining sealing.

For situations when the pressure applied to a seal alternates in direction, as in the case of a deepwater gas pipeline, the bi-directional seal of the seal assembly 237 offers a vastly improved pressure capability over conventional passive seals for large gaps. Conventional passive seals for large gaps require relief spaces on the high-pressure sides of the seal so that their substantially constant volume elastomers will have room to displace whenever the seal gap is smaller than their expected design maximum gap. Provision of a relief space substantially limits the capability of such a passive seal to withstand reverse pressures. While conventional active seals for large gaps do not have this same limitation, their other limitations mentioned above still are major drawbacks.

The hydraulic piston arrangement for stretching seal assembly 237 may cost slightly more than the cam-operated versions of the first two embodiments, but the hydraulic operator is easier to use in the field and offers fewer potential leak paths as well as higher tensioning forces suitable for larger seals or stiffer elastomers than is the case for the rotary camming devices. The ability to overcome friction, which resists the seal assuming its preloaded condition after release of the installation tension, by means of temporarily hydraulically biasing the piston outwardly to overcome the friction is another strong advantage of the hydraulic piston tensioning system. For the hydraulically-operated clamp, hydraulic pressure only needs to be maintained during insertion of the pipe into the clamp bore and then briefly for possible bias of the seal against friction during release of tension. This system still permits the passive compensation of the seals of this invention for seal volume reduction and creep.

It may readily be understood that the seal cross-sections of this invention may be varied or changed from the embodiments shown without departing from this invention. For instance, multiple ridges can be provided on the seal face which contacts the comating seal surface for enhancing trash tolerance and providing redundant seal surfaces. The bonding surfaces of the static seal end and the movable seal end can be varied from the types shown in the drawings for this invention without exceeding the limits of this invention. Likewise, similar seal assemblies can be adapted to both semicircular and circular annular seals, linear or near linear or irregularly shaped seals, and both male and female seals.

The stretching of the seals can also be performed by a number of mechanisms such as wedging, other types of camming action, or other suitable means without departing from this invention. The movable seal end pieces can be segmented for use with irregularly shaped seal patterns. Multiple hydraulic cylinders or cylinders with arcuate or lunate or unusually shaped pistons can also be used for hydraulic tensioning of the seals for installation. These tensioning variations are desirable for semicircular or other irregularly shaped seals. Furthermore, the seals and seal assemblies of this invention are broadly applicable and are not limited solely to usage in pipeline repair clamps. These seals and their operating systems can also be rendered effective as male seals simply by inverting the seals and their operating systems.

Thus, having described several embodiments of seal assemblies and their installation and use in pipeline repair clamps, it is believed that other modifications, variations, and changes will be suggested to those skilled in the art in view of the description set forth above. It is therefore to be understood that all such variations, modifications, and changes are believed to fall within the scope of the invention as defined in the appended claims.

What is claimed is:

1. A sealing apparatus for sealing a flow gap comprising:
   a housing positioned in a first part of a comated pair of parts having a flow gap therebetween;
   an elastomeric seal mounted in the housing;
   a static seal end, bonded to a low pressure end of the elastomeric seal on an inner side of the static seal end and anchored to the housing;
   a movable seal end, bonded to a high pressure end of the elastomeric seal, wherein when said movable seal end is displaced in a direction going away from the static seal end the elastomeric seal is tensioned thereby reducing a transverse cross-section of the elastomeric seal and when the movable end is moved back towards the static seal end the tension on the seal is eased and the transverse cross-section is increased to provide an interference fit with a second part of the flow gap to seal the flow gap against a pressure;
   reciprocable means for tensioning and untensioning the seal, said tensioning means operated by selectably moving the movable end; and
   actuation means for displacing the movable seal end.

2. The sealing apparatus of claim 1, wherein the housing is tubular.

3. The sealing apparatus of claim 1, wherein the elastomeric seal has an annular configuration.

4. The sealing apparatus of claim 1, wherein the elastomeric seal has a substance with a high frictional coefficient embedded in a comating surface of the elastomeric seal.

5. The sealing apparatus of claim 1, wherein the elastomeric seal has at least one antiextrusion device embedded in and bonded to an elastomeric matrix of the seal, said antiextrusion device comprising a corrugated annular ring of rigid material.

6. The sealing apparatus of claim 5, wherein at least one antiextrusion device is embedded on a low pressure side of the seal.

7. The sealing apparatus of claim 1, wherein the tensioning means is at least one hydraulic cylinder.

8. The sealing apparatus of claim 1, wherein the tensioning means is at least one cam.

9. The sealing apparatus of claim 8, wherein the cam is actuated by rotation.

10. The sealing apparatus of claim 1, wherein a contact surface of the elastomeric seal is tapered in a direction going from the region of the elastomeric seal with the most interference with the comating surface toward the movable end of the elastomeric seal.

11. A sealing apparatus for sealing a flow gap between two parts comprising:
    a housing;
    an elastomeric sealing element, wherein a first end of the sealing element is anchored to one end of said housing and is mounted within the housing;
    a reciprocably movable end, said movable end attached to a second end of the sealing element;
    a reciprocable piston for imparting movement to the movable end relative to said housing, said reciprocable piston connected to said movable end, wherein the movable end moves along a path defined by a first position and a second position; and actuation means for reversibly imparting movement to said reciprocable piston and the movable end;

whereby when said movable end moves toward the first position said elastomeric sealing element is relaxed and when said movable end moves toward the second position said elastomeric gripping element is tensioned.

12. The sealing apparatus of claim 11, wherein the actuation means is one or more hydraulic cylinders.

13. The sealing apparatus of claim 11, wherein the sealing element has at least one antiextrusion device embedded and bonded to an elastomeric matrix of said sealing element.

14. The sealing apparatus of claim 11, wherein said reciprocable piston is prevented from substantial displacement after moving said movable end towards the first position to passively bias said seal against a comating sealing surface.

15. A sealing apparatus comprising:

a tubular housing;

a sealing assembly comprising:

an elastomeric element, an anchor end, said anchor end bonded to a first end of the sealing element, and a reciprocably movable end, said movable end bonded to a second end of the sealing element;

a reciprocable piston connected to said movable end, said piston movable along a path defined by a first position and a second position; and a hydraulic cylinder having a first and second hydraulic chamber, wherein when hydraulic pressure is applied to the first hydraulic chamber the piston moves to the second position thereby moving the movable end of the sealing assembly and stretching the elastomeric sealing element, and when hydraulic pressure is applied to the second hydraulic chamber the piston moves towards the first position thereby moving the movable end of the sealing assembly and easing the tension on the sealing element.

16. The apparatus of claim 15, wherein the elastomeric gripping element has a substance with a high frictional coefficient embedded in a sealing surface of the sealing element.

17. The sealing apparatus of claim 15, wherein the sealing element has at least one antiextrusion device embedded and bonded to an elastomeric matrix of the sealing element.

18. The sealing apparatus of claim 15, wherein when the piston is in the second position and the elastomeric sealing element is stretched an interior circumference of the elastomeric sealing element is greater than the exterior perimeter of a pipe inserted in said sealing apparatus, and wherein when the piston is in the first position and the elastomeric sealing element is relaxed the interior circumference of the elastomeric sealing element is less than the exterior perimeter of the pipe.

19. A sealing apparatus for sealing against pressure and flow across a gap between a first body having a first seal surface and a second body having a second seal surface, said first and second seal surfaces substantially parallel to each other, said sealing apparatus comprising:

a groove in the first body, said groove having an anchored first side and a movable second side;

an elastomeric seal positioned in the groove and bonded to the first and second sides of the groove; and means for displacing said movable second side of the groove wherein when said movable second side is displaced in a direction going away from the anchored first side the elastomeric seal is tensioned and when the movable second side of the groove is moved back toward the static seal end the tension on the elastomeric seal is released.

20. The sealing apparatus of claim 19, wherein the elastomeric seal is a female annular seal having a primary contact zone displaced from a midpoint along a length of the seal, said primary contact zone has a smaller inner diameter than the rest of the elastomeric seal.

21. The sealing apparatus of claim 19, wherein the elastomeric seal has a pair of communicating central annular grooves, one groove on a comating interface and another groove on an obverse face of the seal.

22. The sealing apparatus of claim 21, wherein said pair of annular grooves communicate through a plurality of radially connecting ports.

23. The sealing apparatus of claim 19, further comprising an external annular groove positioned between a top side of the groove and an upper side of the elastomeric seal, said external annular groove in communication with an internal annular groove wherein pressure applied to either side of said elastomeric seal can be trapped in said external annular groove, the entrapped pressure in said external annular groove presses down on the upper side of the seal to bias said seal against the second seal surface.

24. A method of sealing a flow gap between two parts comprising:

(a) providing a seal assembly comprising an elastomeric seal;

a static seal end, bonded to the seal on a one end; and a movable seal end, bonded to the seal on a second end, wherein when said movable seal end is displaced in a direction going away from the static seal end the elastomeric seal is tensioned and when the movable end moves back towards the static seal end the tension on the seal is eased;

means for reciprocable tensioning and untensioning the seal, said tensioning means operated by moving the movable end; and means for actuating the displacement of the movable seal;

(b) mounting the seal assembly in an annular housing, wherein the static seal end is anchored to the housing, an internal surface of the housing being a first seal surface of an annular flow gap;

(c) activating the tensioning means to tension the elastomeric seal and reduce a cross-sectional thickness perpendicular to a comating surface of the elastomeric seal;

(d) inserting an object into a bore of the seal assembly while the seal is tensioned, wherein an external surface of the object is a second seal surface of the flow gap; and (e) releasing the tension on the seal to bias the seal against the second seal surface to seal the flow gap.

25. The method of claim 24, wherein the object has a cylindrical configuration.

26. The method of claim 24, wherein the object is tubular.

27. The method of claim 24, wherein said tensioning means is at least one hydraulic cylinder.

28. The method of claim 27, wherein said actuating means is hydraulic fluid.

29. The method of claim 24, wherein said tensioning means is at least one cam.

30. The method of claim 29, wherein said actuating means is rotation.

31. The method of claim 24, wherein when the movable end is in the first position and the elastomeric sealing element is tensioned an interior circumference of the elastomeric sealing element is greater than the exterior perimeter of the object, and wherein the movable end is in the second position and the elastomeric sealing element is relaxed the interior circumference of the elastomeric sealing element is less than the exterior perimeter of the object.

32. A tubular pipeline clamp comprising:
   (a) a housing;
   (b) a gripping mechanism mounted within a bore of the housing proximal to a first end of said housing; and
   (c) an annular seal assembly mounted within the bore of the housing adjacent to the gripping mechanism and proximal to a second end of the housing, said seal assembly comprising:
      an elastomeric seal;
      a static seal end, bonded to a one end of the elastomeric seal on an inner side of the static seal end and anchored to the housing on an outward side of the static seal end; and
      a movable seal end, bonded to a second end of the elastomeric seal, wherein when said movable seal end is displaced in a direction going away from the static seal end the elastomeric seal is tensioned and when the movable end is moved back toward the static seal end the tension on the seal is eased;
      reciprocable means for tensioning and untensioning the seal, said tensioning means operated by moving the movable end; and
      actuation means for displacing the movable seal end;
   whereby when said moveable end of the seal assembly is moved back toward the static seal end the seal is relaxed and passively biases against an exterior surface of the pipe gripped within the housing bore by the gripping mechanism.

33. The clamp of claim 32, wherein the elastomeric seal has an annular configuration.

34. The clamp of claim 32, wherein the elastomeric seal has a substance having a high frictional coefficient embedded in a comating surface of the elastomeric seal.

35. The clamp of claim of 32, wherein the elastomeric seal has at least one antiextrusion device embedded in and bonded to an elastomeric matrix of the seal, said antiextrusion device comprising a corrugated annular ring of rigid material.

36. The clamp of claim of 32, wherein at least one antiextrusion device is embedded on a low pressure side of the seal.

37. The clamp of claim 32, wherein the tensioning means is at least one hydraulic cylinder.

38. The claim of claim 37, wherein the actuation means is hydraulic pressure.

39. The clamp of claim 32, wherein the tensioning means is at least one cam.

40. The clamp of claim 32, wherein the cam is actuated by rotation.

41. The clamp of claim 32, wherein a contact surface of the elastomeric seal is monotonically tapered in a direction going from the smallest inner diameter portion of the elastomeric seal toward the movable end of the elastomeric seal.

42. The clamp of claim 32, wherein when the elastomeric seal is tensioned an interior circumference of the elastomeric sealing element is greater than the exterior circumference of the pipe insert therein, and when the elastomeric seal is untensioned the interior circumference of the elastomeric sealing element is less than the exterior circumference of the pipe.

43. The clamp of claim 32, wherein the elastomeric seal has a primary contact zone, said primary contact zone has a smaller diameter than the rest of the seal.

44. The clamp of claim 43, wherein the primary contact zone is displaced from a midpoint along the length of the seal.

45. The clamp of claim 32, wherein the elastomeric seal has a pair of communicating central annular grooves, one groove on a comating interface and the other groove on an obverse face of the seal.

46. The clamp of claim 45, wherein said pair of annular grooves communicate through a plurality of radially connecting ports.

47. The clamp of claim 32, wherein said annular seal assembly further comprising an external annular groove positioned between the bore of the housing and an external cylindrical side of the elastomeric seal, said external annular groove in communication with an internal annular groove wherein pressure applied to either side of said elastomeric seal can be trapped in said external annular groove, the entrapped pressure in said external annular groove presses down on the external cylindrical side of the seal to bias said seal against the second seal surface.

48. The clamp of claim 32, wherein pressure is communicated to an external cylindrical side of the seal whenever relatively high pressure from the movable side of the seal is retained by the elastomeric seal, the retained pressure provides a pressure bias urging said seal into more intimate sealing contact with a comating sealing surface.

49. A method of installing a pipe in the tubular pipeline end clamp of claim 32 comprising:
   (a) loosening the gripping mechanism;
   (b) tensioning the elastomeric seal of the seal assembly;
   (c) inserting a pipe into the clamp through the bore in the gripping mechanism and the seal assembly;
   (d) positioning the pipe to the desired location;
   (e) engaging the gripping mechanism to grip an exterior surface of the pipe; and
   (f) releasing the tensioning means to bias the elastomeric seal against the exterior surface of the pipe to seal a fluid gap between the housing and exterior surface of the pipe.

50. A sealing apparatus for sealing a flow gap comprising:
   a housing;
   an elastomeric seal;
   a static seal end, bonded to a one end of the elastomeric seal on an inner side of the static seal end and anchored to the housing; and
   a movable seal end, bonded to a second end of the elastomeric seal, wherein when said movable seal end is displaced in a direction going away from the static seal end the elastomeric seal is tensioned and when the movable end is moved back towards the static seal end the tension on the seal is eased;
   a reciprocable piston for tensioning and untensioning the seal, said reciprocable piston is operated by selectably moving the movable end; and
   actuation means for displacing the movable seal end.

51. A sealing apparatus for sealing a flow gap comprising:
   a housing;
   an elastomeric seal;
   a static seal end, bonded to a one end of the elastomeric seal on an inner side of the static seal end and anchored to the housing; and a movable seal end, bonded to a second end of the elastomeric seal, wherein when said movable seal end is displaced in a direction going away from the static seal end the elastomeric seal is tensioned and when the movable end is moved back towards the static seal end the tension on the seal is eased;

a rotatable cam for tensioning and untensioning the seal, said tensioning means operated by selectably moving the movable end; and actuation means for displacing the movable seal end.

52. A sealing apparatus for sealing a flow gap comprising:

a housing positioned in a first part of a comated pair of parts having a flow gap therebetween;

an elastomeric seal mounted in the housing;

a static seal end, bonded to a one low pressure end of the elastomeric seal on an inner side of the static seal end and anchored to the housing on an outward side of the static seal end; and a movable seal end, bonded to a second high pressure end of the elastomeric seal, wherein when said movable seal end is displaced in a direction going away from the static seal end the elastomeric seal is tensioned thereby reducing a transverse cross-section of the elastomeric seal and when the movable end is moved back towards the static seal end the tension on the seal is eased and the transverse cross-section is increased to provide an interference fit with a second part of the flow gap to seal the flow gap against a pressure;

a reciprocable piston for tensioning and untensioning the seal, said tensioning means operated by selectably moving the movable end; and actuation means for displacing the movable seal end.

53. The sealing apparatus of claim 52, wherein the piston reciprocates along a path defined by a first end position and a second end position such that when the piston is in the first position the elastomeric seal is tensioned and does not project into the flow gap between the pair of parts and when the piston is in the second position the elastomeric seal is relaxed and projects sufficiently into the seal gap to seal the flow gap.

54. The sealing apparatus of claim 1, wherein the elastomeric seal is annular and has at least one antiextrusion device embedded in and bonded to an elastomeric matrix of the seal, said antiextrusion device comprising a corrugated sheet of rigid material.

55. The sealing apparatus of claim 1, wherein the elastomeric seal has at least one antiextrusion device embedded in and bonded to an elastomeric matrix of the seal, said antiextrusion device comprising a radially corrugated annular ring of rigid material having a midplane normal to an axis of the seal.

56. The sealing apparatus of claim 1, wherein the pressure retained by the seal traverses a first space between the housing and the moveable end to communicate with a second space between the housing and a surface of the seal facing the housing to bias against the surface of the seal facing the housing and thereby bias an opposed face of the seal against the comated part.

57. The sealing apparatus of claim 56, wherein the moveable end is prevented fro substantial displacement after providing the interference fit with the second part.

58. The sealing apparatus of claim 1, wherein a cross-section of the elastomeric seal is monotonically reduced as the elastomeric seal goes from a point of greatest interference with the comating surface towards the movable end and the static end of the elastomeric seal.

59. The sealing apparatus of claim 1, wherein said movable seal end is sufficiently displaceable so that the elastomeric seal interference with the comating second part during assembly of the parts is minimized when the seal is tensioned.

60. The sealing apparatus of claim 1, wherein said reciprocating means tenses the elastomeric sealing element during assembly of the comated pair of parts and said reciprocating means eases the tension on the elastomeric sealing element following assembly of the said two parts; said reciprocating means is prevented from substantial displacement after relaxation of the elastomeric sealing element to maintain passive bias of said sealing element against the second part of the flow gap.

61. A sealing apparatus comprising:

a housing;

a sealing assembly contained in the housing, said seal assembly comprising:

an elastomeric element, an anchor end, said anchor end bonded to a first end of the sealing element and anchored to the housing, and a reciprocably movable end, said movable end bonded to a second end of the sealing element;

a reciprocable piston connected to said movable end, said piston movable along a path defined by a first position and a second position; and a hydraulic cylinder having a first and second hydraulic chamber, wherein when hydraulic pressure is applied to the first hydraulic chamber the piston moves to the second position thereby moving the movable end of the sealing assembly and stretching the elastomeric sealing element, and when hydraulic pressure is applied to the second hydraulic chamber the piston moves towards the first position thereby moving the movable end of the sealing assembly and easing the tension on the sealing element.

62. The sealing apparatus of claim 19, wherein the sealing apparatus and the elastomeric seal are annular.

63. An annular sealing apparatus for sealing against pressure and flow across an annular gap between a first body having a first seal surface and a second body having a second seal surface, wherein said first and second seal surfaces are substantially concentric, said sealing apparatus comprising:

a groove in the first body, said groove having an anchoring first transverse side and a movable second transverse side;

an annular elastomeric seal positioned in the groove and bonded to the first and second transverse sides of the groove; and means for displacing said movable second side of the groove wherein when said movable second side is displaced in a direction going away from the anchored first side the elastomeric seal is tensioned and when the movable second side of the groove is moved back toward the static seal end the tension on the elastomeric seal is released.

64. The sealing apparatus of claim 62, wherein the elastomeric seal comprises:

a first sealing surface which comates with the first seal surface of the first body, said first sealing surface of the elastomeric seal having a centrally positioned first annular cavity;

a second sealing surface which comates with the second seal surface of the second body, said second sealing surface of the elastomeric seal having a centrally positioned second annular cavity and with a pair of radially projecting annular sealing ridges with one sealing ridge positioned adjacent to and on each side of said second annular cavity, wherein said annular sealing ridges project sufficiently to have an interference fit with said second seal surface;

one or more radial ports connecting the first and second annular cavities; and annular sealing means to isolate said first annular cavity.

65. The sealing apparatus of claim 63, wherein whenever a pressure having a magnitude higher than previously experienced by the sealing apparatus is applied to a side of the annular gap of the sealing apparatus, said pressure passes the radially projecting annular sealing ridge on the pressured side to enter the second annular cavity and is communicated to the first annular cavity through the radial port; whereby the communicated pressure within the first annular cavity biases the elastomeric seal against the second seal surface to enhance the sealing action of the sealing apparatus.

66. A method of sealing an annular flow gap between two parts comprising:

(a) providing a seal assembly comprising:

an annular elastomeric seal that has a cross section having an interference fit with a comating first surface of a first part when the seal is relaxed;

a static seal end, bonded to the seal on a one end;

a movable seal end, bonded to the seal on a second end, wherein when said movable seal end is displaced in a direction going away from the static seal end the elastomeric seal is tensioned so that a cross-sectional area of the elastomeric seal is reduced and when the movable end moves back towards the static seal end the tension on the seal is eased;

means for reciprocably tensioning and untensioning the seal, said tensioning means selectably operated by axially moving the movable end; and means for actuating the displacement of the movable seal;

(b) mounting the seal assembly in a groove in a second part that provides a housing for the seal assembly, wherein the static seal end is anchored to the second part, and an internal cylindrical surface of the second part provides a second seal surface;

(c) activating the tensioning means to tension the elastomeric seal and thereby reduce the cross-sectional area so that the elastomeric seal does not interfere with the comating first surface of the first part;

(d) assembling the said first and second parts together while the elastomeric seal is tensioned; and (e) releasing the tension on the elastomeric seal to thereby bias the seal against the comating first surface of the first part and seal the flow gap.

* * * * *